Nov. 10, 1970 R. B. PERRY 3,538,613
REGENERATED CELLULOSE SOFTENER RECOVERY
Filed Aug. 27, 1968 2 Sheets-Sheet 1
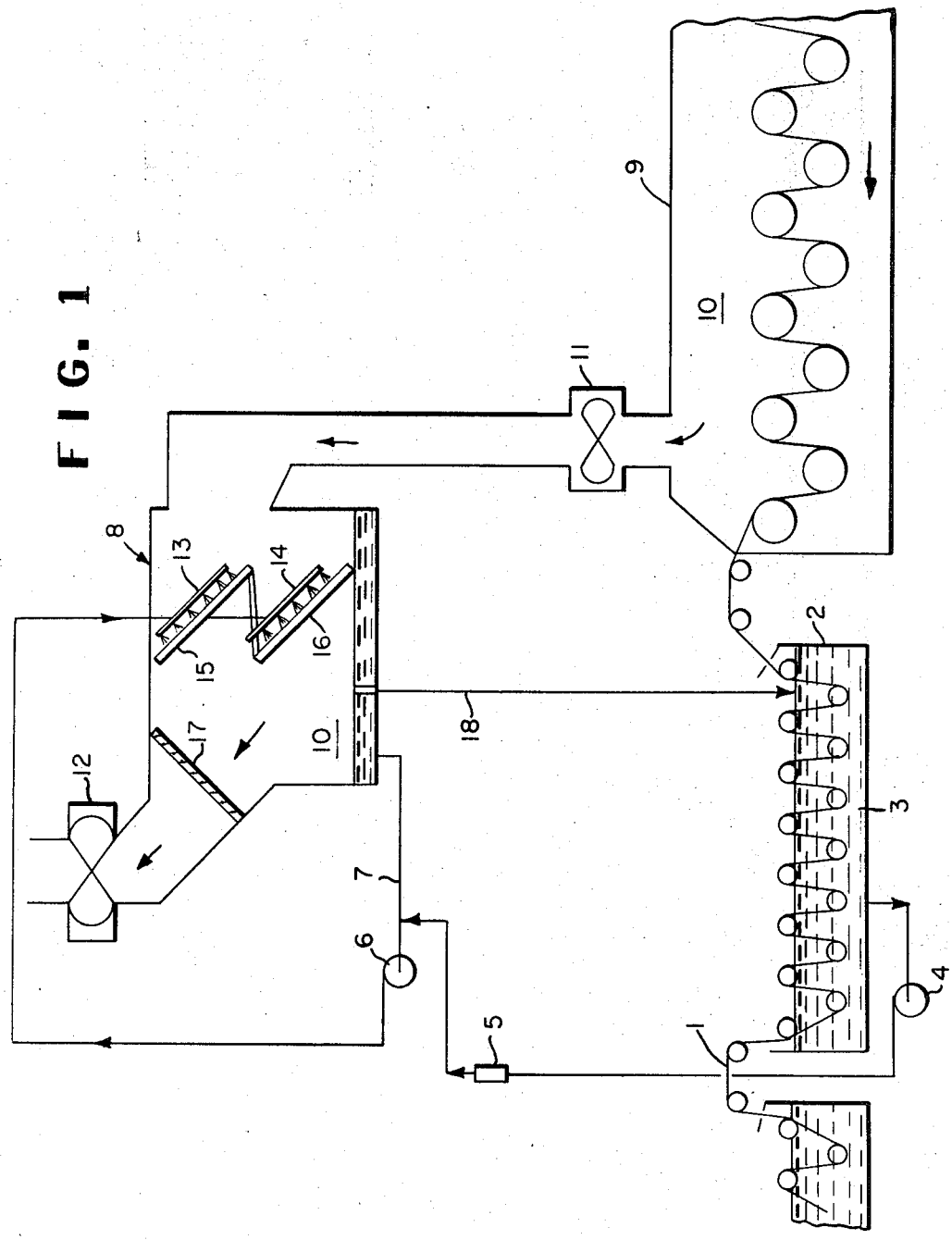
INVENTOR
ROBERT B. PERRY
BY
ATTORNEY Patent text page …

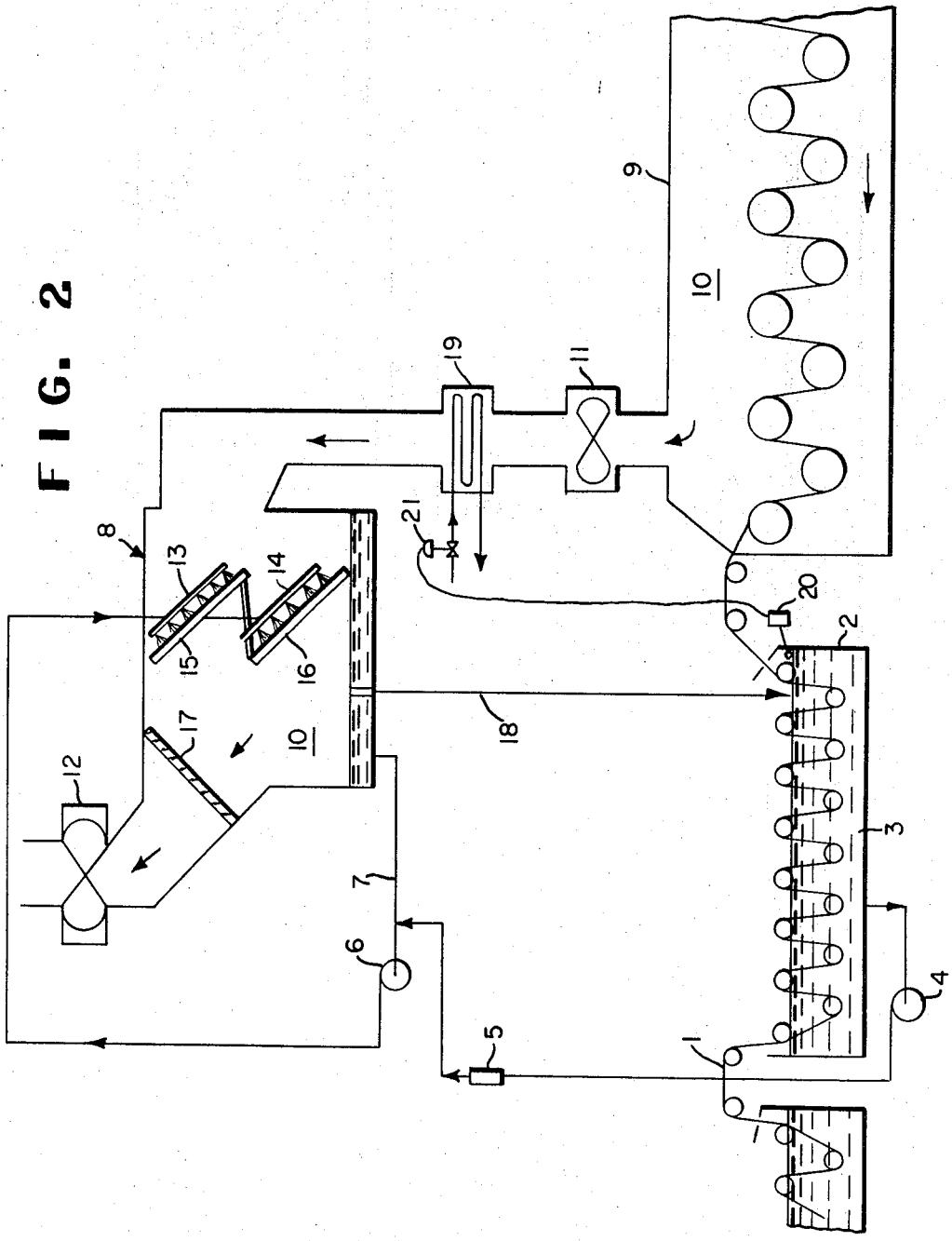

United States Patent Office 3,538,613
Patented Nov. 10, 1970

3,538,613
REGENERATED CELLULOSE SOFTENER RECOVERY
Robert Bruce Perry, Lawrence, Kans., assignor to E. I. du Pont de Nemours and Company, Wilmington, Del., a corporation of Delaware
Filed Aug. 27, 1968, Ser. No. 755,679
Int. Cl. F26b 3/00
U.S. Cl. 34—23      14 Claims

ABSTRACT OF THE DISCLOSURE

Continuous process for the recovery of cellulose softener by scrubbing exhaust air with aqueous softener solution and returning softener solution to the treating bath, and an apparatus therefor.

BACKGROUND OF THE INVENTION

In the processing of regenerated cellulose, various types of plasticizers are added to the gel or water-bearing web of regenerated cellulose to increase the durability of the dried web. Commonly used plasticizers comprise water and one or more softening agents such as glycerin, ethylene glycol, and propylene glycol. Combinations of water, glycerin, and propylene glycol are currently most commonly employed to pasticize gel-state webs of regenerated cellulose.

The softener solution is generally added by passing the cellulose web through a heated bath of the solution, after which the web enters a heated drying chamber.

In these process steps, cellulose softener is lost in two ways. First, and most important, in the drying step excess softener is exhausted by the air current which dry the cellulose film. A second problem results from the fact that the cellulose generally contains about from 200 to 350 weight percent water when it enters the softener bath. As the film is heated in the warmed softener, the capacity for water retention diminishes and the water formerly retained in the cellulose escapes into the softener bath, diluting its concentration and increasing its volume. If this diluted softener solution is not continuously removed from the softener tank, the increasing volume will cause the tank to overflow, resulting in a total loss of the overflowing softener.

Recovery systems previously used to reconcentrate the water-swelled softener solution were often costly, but the alternative of letting the overflow go down the drain not only would result in softener loss, but would cause a pollution problem as well. Various absorption means have been used in exhaust ducts of the drying chamber for recovery of the gaseous softener solution which was removed from the treated film in the drying process. This recovered softener was then stored, and subsequently returned to the treating tank for reuse in the process.

The many separate steps necessary for the reconcentration and recovery of softener in this process have heretofore substantially contributed to production costs. There is consequently a continual demand for more efficient softener recovery systems.

SUMMARY OF THE INVENTION

The instant invention provides a continuous, automatic, reclamation process which simultaneously reconcentrates the water-swelled softener solution in the treating tank and reclaims the softener exhausted from the drying chamber. Specifically, the instant invention relates to an improvement in the process for the treatment of regenerated cellulose film by passing the film through a bath of aqueous softener solution and then drying the film in a chamber having a current of heated air passing therethrough, the current of air being exhausted from the chamber through ductwork, the improvement which comprises diverting a portion of the aqueous softener solution to an absorption unit in the ductwork, dispersing the diverted softener solution in the absorption unit so as to bring it into intimate contact with the exhaust air, recollecting the softener solution and returning the softener solution to the bath.

The instant invention further provides an apparatus for the reclamation of softener solution in the above process comprising an absorption unit in the ductwork, means for diverting a portion of the softener solution to the absorption unit, means for dispersing the softener solution in the absorption unit so as to bring it into intimate contact with the exhaust air, means for recollecting the softener solution, and means for returning the softener solution to the softener bath.

BRIEF DESCRIPTION OF THE DRAWINGS

FIGS. 1 and 2 are schematic representations of specific apparatus arrangements which can be used in the instant invention.

DESCRIPTION OF THE PREFERRED EMBODIMENTS

The instant invention operates on the affinity to water of the softeners used for the cellulose treatment. The dilution of the softener solution in the softening tank by the discharge of water from the cellulose being treated therefore increases the suitability of the softening solution as a recovery solution for the vaporized softener in the exhaust air from the drying chamber. The softener solution, upon being dispersed in the exhaust air, absorbs the gaseous softener, and, at the same time, evaporates some of its water content into the exhaust air.

The softener can be removed from the treating tank to the absorption unit by any suitable arrangement of pumps and piping, varying according to the relative locations of the softener bath and the exhaust ductwork and the quantities of film being treated, as will be obvious to those skilled in the art. The aqueous softener solution should be dispersed so as to maximize its surface area, to absorb as much of the vaporized softener from the exhaust stream as possible. Absorption units which can be used in the process of the instant invention include packed column, sieve plate column, floating bed, fiberglass pad or capillary cell types of units. The particular unit used should be selected with regard to the pressure drop that the unit effects on the exhaust flow, the type of entrainment separator used in the system, if any, the degree to which the scrubber unit becomes fouled during operation, and cost of cleaning the unit.

A particular absorption unit found particularly satisfactory in the instant invention is described in copending, coassigned, application Ser. No. 755,681 which is hereby incorporated by reference. Using those absorption units, the aqueous softener solution taken from the treatment tank is passed through spray nozzles which disperse the softener solution into a fine spray, the spray impinging onto perforated absorption plates which are positioned in the exhaust air stream. Perforated plates which have been found especially satisfactory are of the type which comprise a rigid, preferably metallic plate having thin slots formed therein in a herringbone pattern. The plate is preferably a 26 gauge stainless steel, and the slots comprise about 5% of the area of the plate. Each slot is about 0.012 inch wide and approximately ½ inch long.

These absorption plates, together with the spray nozzles, are positioned in the exhaust stream, preferably at an angle of about 45° with the flow of the exhaust gases. With the spray nozzles positioned directly above the absorption plates, this angles facilitates the recollection of the liquid droplets in the sump below the plates. In operation, the perimeter of each slot in the absorption plates becomes wetted with the sprayed softener liquid and bubbles tend to form at the slots of the plates as the exhaust gases pass through. The bubbles substantially increase the surface area of the liquid softener and increase in size after they are formed, thereby maximizing the exchange surface with the exhaust gases. The bubbles thus aid the absorption of softener from the exhaust gases and, at the same time, give up water from the softener solution to the exhaust air. The enriched softener can then be collected, for example, in a sump formed in the bottom of the absorption unit. It has been found particularly effective to provide a louvered entrainment separator of the type commonly used in the art, in the exhaust stream, slightly downstream from the perforated plates to aid in the recollection of fine droplets of softener solution that may become suspended in the exhaust stream.

The quantities of softener circulated through the absorption unit will vary with the size and type of unit used. However, with the preferred absorption unit of the instant invention, a flow rate of about 5.5 gallons of softener solution per minute for every square foot of absorption plate area has been found most satisfactory.

The recollected softener solution can then be returned directly to the softener bath or the composition of the solution can be adjusted in a separate mixing chamber by the addition of more water or softener.

The process and apparatus of the instant invention can generally recover up to about 80% of the softener vaporized in the exhaust air. At the same time, substantial quantities of water are evaporated from the softener solution, further increasing the softener concentration.

For a better understanding of the instant invention, a specific embodiment is schematically illustrated in FIG. 1. In that figure, a regenerated cellulose web 1, passing over rollers through treating tank 2, is heated by the warmed softener 3, causing substantial quantities of the water previously held by the film to be discharged into the tank, diluting the softener solution. The excess, diluted fluid is taken off by pump 4 and transported to meter 5 which regulates the quantity of diluted softener solution passing into the reclamation cycle. Upon entering the reclamation cycle, the softener is pumped by pump 6 through recirculating lines 7 to an absorption unit 8. The absorption unit is in the exhaust ductwork of dryer 9, the exhaust air 10 passing concurrently through the absorption unit, propelled by fans 11 and 12. The diluted softener solution enters the absorption unit and is dispersed therein by spray banks 13 and 14, impinging on absorption media 15 and 16. The softener solution is then collected in a sump in the bottom of the absorption unit with the aid of entrainment separator 17 whereafter it is either recycled in the reclamation cycle or passed back to tank 2 through pipe 18 where it is again used to treat the regenerated cellulose film passing through the tank.

As previously indicated, the exhaust gases, while giving up a large percentage of the vaporized softener taken on in the dryer, at the same time absorb water from the softener solution cycled into the absorption unit from the treatment tank. This water absorption provides a further means of controlling the water content and level in the treatment tank.

This can be effected by an embodiment of the instant invention such as that schematically illustrated in FIG. 2. In that figure, 19 represents heat exchanger in the exhaust ductwork, which absorbs heat from the exhaust gases. Interruption of the flow of fluid through the heat exchanger will result in a higher temperature of the exhaust gases passing through the absorption chamber. The gases will consequently evaporate a greater amount of water from the softener solution sprayed into the absorption unit. The level of the solution in the treating tank can be controlled by providing a liquid level sensor 20 positioned in tank 2 so as to become activated upon the increase of the fluid level within the tank. The activation of the sensor, in turn, results in the reduction of the flow of heat exchange fluid through heat exchanger 19 by means of valve 21. This results in an evaporation of a larger amount of water from the softening solution in the absorption chamber.

The following specific example further illustrates the process and apparatus of this invention.

EXAMPLE

Regenerated cellulose web is treated in an apparatus of the type illustrated in FIG. 1 by consecutively passing it through the softener bath and the drying chamber. Approximately 14,000 cubic feet per minute of cellulose web dryer exhaust air 10 is exhausted via dryer discharge fan 11 directly to an absorption unit 8 where propylene glycol is removed and water evaporated into the exhaust air. The absorption unit comprises the preferred herringbone pattern absorption plate. This humidified effluent air is then discharged from the absorption unit to the atmosphere by exhaust fan. The exhaust air, as it leaves the web dryer, has a relative humidity of about 25% and contains $1.2 \times 10^{-4}$ pound of propylene glycol per cubic foot of air. Thus, 1.68 pounds of propylene glycol per minute is passed to the absorption unit via the dryer effluent air stream. The maximum effluent air velocity through the absorption unit is 220 feet per minute while the maximum air velocity through the absorption medium slots is 4000 feet per minute.

Concurrently, 360 gallons per minute of aqueous softener solution is recirculated via the recirculating spray supply line 7 from the sump of the absorption unit through the spray head banks 13 and 14 onto absorption plates 15 and 16 in the amount of 5.5 gallons per minute per square foot of absorption media. Circulating pump 4 pumps 15 gallons per minute of softener solution containing 11% propylene glycol into the inlet side of absorption unit circulating pump 6. Propylene glycol is removed from the dryer effluent air stream at the gas-liquid interface of the absorption media 15 and 16 so that the humidified effluent air, as it leaves the absorption unit, contains $0.2 \times 10^{-4}$ pound of propylene glycol per cubic foot of air. Thus 1.4 pounds of propylene glycol per minute is passed from the effluent air stream to the softener solution scrubbing liquid. Water is evaporated from the scrubbing liquid in the absorption unit into the dryer effluent air at the rate of 15 pounds per minute. This enriches the solution in the sump of the absorption unit such that softener solution containing 13% propylene glycol is returned to the softener tank.

The degree of softener enrichment of the solution from the softener tank is such that approximately 80% of the propylene glycol content of the web dryer effluent air stream is removed.

I claim:

1. In the process for the treatment of regenerated cellulose film by passing the film through a bath of aqueous solution of softener which is readily soluble in water and then drying the film in a chamber having a current of heated air passing therethrough, the current of air being exhausted from the chamber through ductwork, the improvement which comprises diverting a portion of the aqueous softener solution to an absorption unit in the ductwork, dispersing the diverted softener solution in the absorption unit so as to bring it into intimate contact with the exhaust air, recollecting the softener solution and returning the softener solution to the bath.

2. A process of claim 1 wherein the softener solution is dispersed in the exhaust air current by spraying the solution onto at least one absorption medium.

3. A process of claim 2 wherein the dispersed softener solution is recollected by means of a louvered entrainment separator positioned downstream from the absorption media.

4. A process of claim 3 wherein the softener solution is sprayed onto substantially flat absorption plates having a plurality of apertures formed therein.

5. A process of claim 4 wherein the apertures formed in the absorption plate comprise about 5% of the surface area of the plate and have a slit-like configuration.

6. A process of claim 5 wherein the apertures are arranged in a herringbone pattern and have a maximum width of about 0.012 inch.

7. In an apparatus for the treatment of regenerated cellulose film comprising a bath of aqueous softener solution, a drying chamber having a current of heated air passing therethrough, an exhaust ductwork in the drying chamber, means to exhaust the heated air through the ductwork, and means for the consecutive transmission of a regenerated cellulose web through the bath of softener solution and the drying chamber, the improvement which comprises an absorption chamber in the ductwork, means for diverting a portion of the softener solution to the absorption chamber, means for dispersing the softener solution in the absorption chamber so as to bring it into intimate contact with the exhaust air, means for recollecting the softener solution, and means for returning the softener solution to the softener bath.

8. An apparatus of claim 7 wherein the means for dispersing the softener solution comprises a plurality of sprayheads situated so as to impinge upon at least one absorption plate in the absorption chamber.

9. An apparatus of claim 8 wherein the absorption plates are positioned at an angle of about 45° with respect to the flow of exhaust gases through the ductwork.

10. An apparatus of claim 8 wherein the absorption plates each comprise a flat plate having a plurality of apertures formed therein.

11. An apparatus of claim 10 wherein the apertures formed in the absorption plate are slits having a maximum width of 0.012 inch and are arranged in a herringbone configuration.

12. An apparatus of claim 11 wherein the absorption plates are 26 gauge stainless steel.

13. An apparatus of claim 8 wherein the means for recollecting the softener solution comprises a sump formed in a lower portion of the absorption chamber and an entrainment separator positioned downstream from the absorption plates.

14. An apparatus of claim 8 further comprising a heat exchanger in the ductwork upstream from the absorption unit of the type having a heat exchanging fluid flowing therethrough, the heat exchanger being regulatorily connected with a sensor in the softener bath so that the flow of heat exchanging fluid through the heat exchanger is reduced as the level of softener solution in the softener bath rises.

References Cited
UNITED STATES PATENTS

| | | | |
|---|---|---|---|
| 1,418,363 | 6/1922 | Coggeshall et al. | 34—27 |
| 3,087,254 | 4/1963 | Kubodera | 34—77 X |
| 3,134,652 | 5/1964 | D'Angelo et al. | 34—80 X |

CHARLES SUKALO, Primary Examiner

U.S. Cl. X.R.

34—77